(12) United States Patent
Son

(10) Patent No.: US 6,882,382 B2
(45) Date of Patent: Apr. 19, 2005

(54) SURFACE LIGHT SOURCE DEVICE AND LIQUID CRYSTAL DISPLAY ASSEMBLY USING THE SAME

(75) Inventor: Yang-Han Son, Kyungsangnam-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/448,416

(22) Filed: May 30, 2003

(65) Prior Publication Data

US 2004/0008506 A1 Jan. 15, 2004

(30) Foreign Application Priority Data

May 31, 2002 (KR) ........................................ 2002-30619
Jan. 11, 2003 (KR) ........................................ 2003-1809

(51) Int. Cl.[7] ........................................... G02F 1/1335
(52) U.S. Cl. ........................................... 349/65; 362/31
(58) Field of Search ............................... 349/61, 62, 63, 349/64, 65, 67, 68; 362/26, 31

(56) References Cited

U.S. PATENT DOCUMENTS 6,721,022 B1 * 4/2004 Wang ........................... 349/69
6,744,480 B1 * 6/2004 Kaneko ........................ 349/65
6,784,958 B1 * 8/2004 Jang ........................... 349/113

OTHER PUBLICATIONS

Korean Patent Abstract Publication No. P2002–39273, dated May 25, 2002, 3 sheets.
Korean Patent Abstract Publication No. 95–1922, dated Jan. 4, 1995, 2 sheets.
Korean Patent Abstract Publication No. P1996–15030, dated May 22, 1996, 2 sheets.
Korean Patent Abstract Publication No. P1996–24562, dated Jul. 20, 1996, 2 sheets.
Korean Patent Abstract Publication No. P1996–15029, dated May 22, 1996, 2 sheets.

* cited by examiner

*Primary Examiner*—Kenneth Parker
*Assistant Examiner*—David Y. Chung
(74) *Attorney, Agent, or Firm*—Stein, McEwen & Bui, LLP

(57) ABSTRACT

A surface light source device includes a light guide plate which guides light upward and downward, a light quantity adjustment unit which is provided on at least one of top and bottom surfaces of the light guide plate and adjusts the quantity of light above the light guide plate to be different from that below the light guide plate, an emitting device which is provided to at least one side of the light guide plate, and diffusion plates which are respectively installed at the top and bottom surfaces of the light guide plate. By adjusting the quantities of light radiated above and below the light guide plate, the brightness of an image can be easily adjusted.

14 Claims, 5 Drawing Sheets

SURFACE LIGHT SOURCE DEVICE AND LIQUID CRYSTAL DISPLAY ASSEMBLY USING THE SAME

CROSS-REFERENCE TO RELATED APPLICATIONS

This application claims the benefit of Korean Patent Application Nos. 2002-30619 filed on May 31, 2002 and 2003-1809 filed on Jan. 11, 2003, the disclosures of which are incorporated herein by reference.

BACKGROUND OF THE INVENTION

1. Field of the Invention

The present invention relates to a liquid crystal display (LCD) assembly using a surface light source device, and more particularly, to an LCD assembly using a surface light source device which can radiate light at two LCD devices at different luminances.

2. Description of the Related Art

Generally, surface light source devices are used as light sources for light receiving devices. Such light source devices for LCD devices are disclosed in Japanese Patent Publication No. 60-216435 and Korean Patent Publication Nos. 1995-1922, 1996-15030, 1996-24562, and 1994-15029.

For example, a conventional surface light source device includes a light guide plate, a reflection plate fixed on a bottom of the light guide plate, a diffusion plate formed on the light guide plate, and an emitting device, which is implemented by a fluorescent lamp or a light emitting diode (LED), that is fixed on at least one side of the light guide plate. In such a surface light source device, the light guide plate has a structure that scatters and diffuses light on one side of a transparent acryl resin.

Other types of light guide plates include blasting etching types, enplus types, optical insertion (OPI) types, double-sided prism types, and hologram pattern types. Such light guide plates are made by forming scratches on an acryl substrate, in a predetermined pattern, so as to emit light only from one side of the substrate.

Since conventional surface light source devices emit light only from one side, where a stack of two LCD devices is used as in dual type cellular phones, as shown in FIG. 1, surface light source devices 13 and 14 must be installed for LCD devices 11 and 12, respectively. Accordingly, the thickness of the products increases, and thus it is difficult to manufacture thin and light products.

To overcome the above problem, Korean Patent Publication No. 2002-39273 discloses surface light source devices that emit light from both sides thereof. However, such surface light source devices have a problem in that the quantity of light emitted upward cannot be adjusted to be similar to the quantity of light emitted downward. Since the quantity of light emitted upward cannot be actively controlled so as to be different from light emitted downward, an after image of one LCD device smaller than the other LCD device appears on an image of the larger LCD device. Moreover, such conventional surface light source devices have low luminance, and thus there is a limit in increasing the luminance of an image formed by LCD devices.

SUMMARY OF THE INVENTION

Accordingly, it is an aspect of the present invention to provide a surface light source device for a liquid crystal display (LCD) assembly having LCD devices, which uniformly radiates light upward and downward from a light guide plate at different luminances.

Another aspect of the present invention is to provide a surface light source device for an LCD assembly, which increases the luminance of light radiated from an emitting device using the resonance effect of the light.

Yet another aspect of the present invention is to provide a light and thin LCD assembly, in which light can be radiated at two stacked LCD devices.

Additional aspects and advantages of the invention will be set forth in part in the description which follows and, in part, will be obvious from the description, or may be learned by practice of the invention.

To achieve the above and/or other aspects of the present invention, there is provided a surface light source device comprising a light guide plate which guides light upward and downward, a light quantity adjustment unit which is provided on at least one of top and bottom surfaces of the light guide plate and adjusts a quantity of the light above the light guide plate to be different between from below the light guide plate, an emitting device which is installed to at least one side of the light guide plate, and diffusion plates which are respectively installed at the top and bottom surfaces of the light guide plate.

The light quantity adjustment unit may comprise a corrosive surface which is formed by corroding at least one of the top and bottom surfaces of the light guide plate so as to adjust a transmittance of the light or comprise a light transmitting sheet having a different transmittance from that of the light guide plate.

A radiation area above the light guide plate may be different from a radiation area below the light guide plate.

The surface light source device may further comprise a brightness enhancement film which is attached to at least one of the top and bottom surfaces of the light guide plate and resonates the light emitted from the emitting device so as to increase a brightness of the light.

To achieve the above and/or other aspects the present invention, there is provided another surface light source device comprising a light guide plate which guides light upward and downward, and a brightness enhancement film which is provided on at least one of top and bottom surfaces of the light guide plate and resonates the light so as to increase a brightness of the light.

The surface light source device may further comprise diffusion plates which are respectively provided on top and bottom surfaces of the brightness enhancement film so as to diffuse the light.

The brightness enhancement film may comprise a resonance layer and diffusion layers respectively attached to top and bottom surfaces of the resonance layer.

To achieve the above and/or other aspects of the present invention, there is provided an LCD assembly comprising first and second LCD devices which are stacked with respect to each other, a light guide plate which is disposed between the first and second LCD devices and guides light upward and downward, a light quantity adjustment unit which is provided on at least one of top and bottom surfaces of the light guide plate and adjusts a quantity of the light above the light guide plate to be different from below the light guide plate, an emitting device which is installed to at least one side of the light guide plate, and diffusion plates which are respectively installed at the top and bottom surfaces of the light guide plate.

The LCD assembly may further comprise a light blocking device which restricts the light radiated to one of the first and second LCD devices to an area corresponding to the one of the first and second LCD devices.

To achieve the above and/or other aspects of the present invention, there is provided another LCD assembly comprising first and second LCD devices which are stacked with respect to each other, a light guide plate which is disposed between the first and second LCD devices and guides light upward and downward an emitting device which is installed to one side of the light guide plate, and a brightness enhancement film which is attached to at least one of top and bottom surfaces of the light guide plate and resonates the light emitted from the emitting device so as to increase a brightness of the light. The LCD assembly may further comprise a light quantity adjustment unit which is provided on at least one of the top and bottom surfaces of the light guide plate.

BRIEF DESCRIPTION OF THE DRAWINGS

These and/or other aspects and advantages of the present invention will become more apparent and more readily appreciated from the following description of the embodiments taken in conjunction with the accompanying drawings of which.

DETAILED DESCRIPTION OF THE PREFERRED EMBODIMENTS

Figure 1:
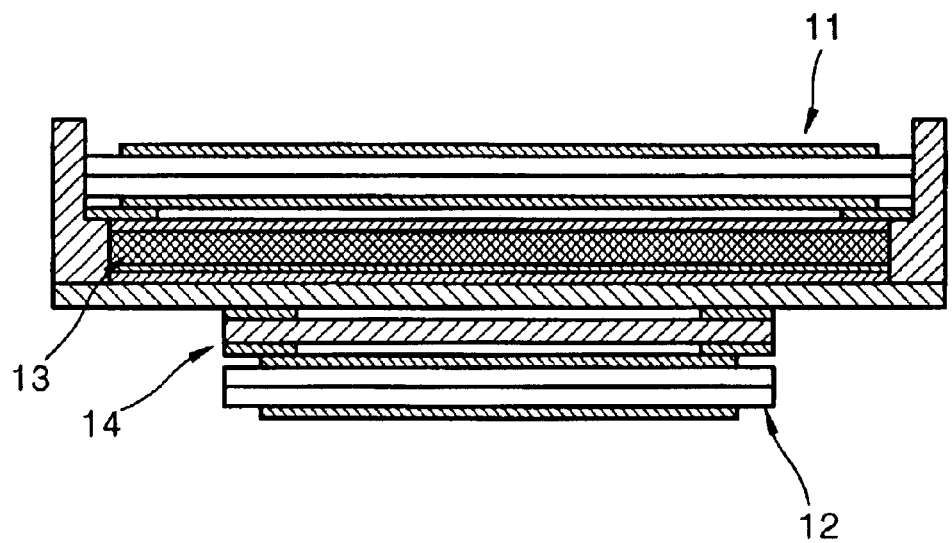
FIG. 1 is a cross-sectional view of a conventional liquid crystal display (LCD) assembly.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
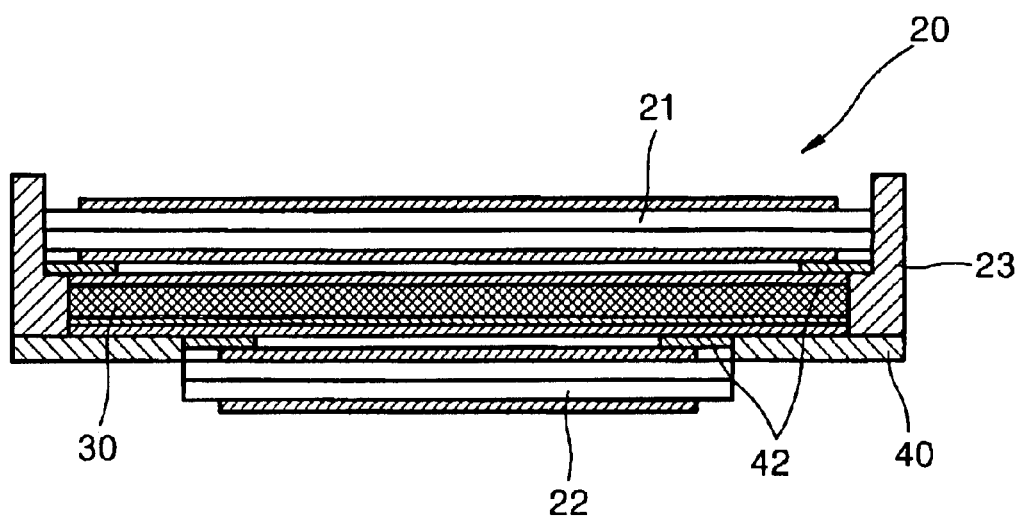
FIG. 2 is a cross-sectional view of an LCD assembly according to an embodiment of the present invention.

FIG. 2 shows a surface light source device and a liquid crystal display (LCD) assembly using the same, according to an embodiment of the present invention. Referring to FIG. 2, the LCD assembly 20 includes first and second LCD devices 21 and 22, a surface light source device 30 which is disposed between the first and second LCD devices 21 and 22 and serves as a rear light source, a circuit board 40 which drives the first and second LCD devices 21 and 22 and the surface light source device 30, and a case 23 which combines and fixes the surface light source device 30, the first and second LCD devices 21 and 22, and the circuit board 40.

Substrates (not shown), on which a driving electrode pattern or a thin film transistor (TFT) pattern is formed, are respectively joined to the first and second LCD devices 21 and 22 such that the substrates face each other, thereby forming a liquid crystal injection space into which a liquid crystal, such as TN or STN, is injected. Effective screens having the same or different standards may be respectively formed in the first and second LCD devices 21 and 22. For example, in the case of a dual type cellular phone, an LCD device exposed to the outside may be larger than that positioned inside the cellular phone.

Figure 3:
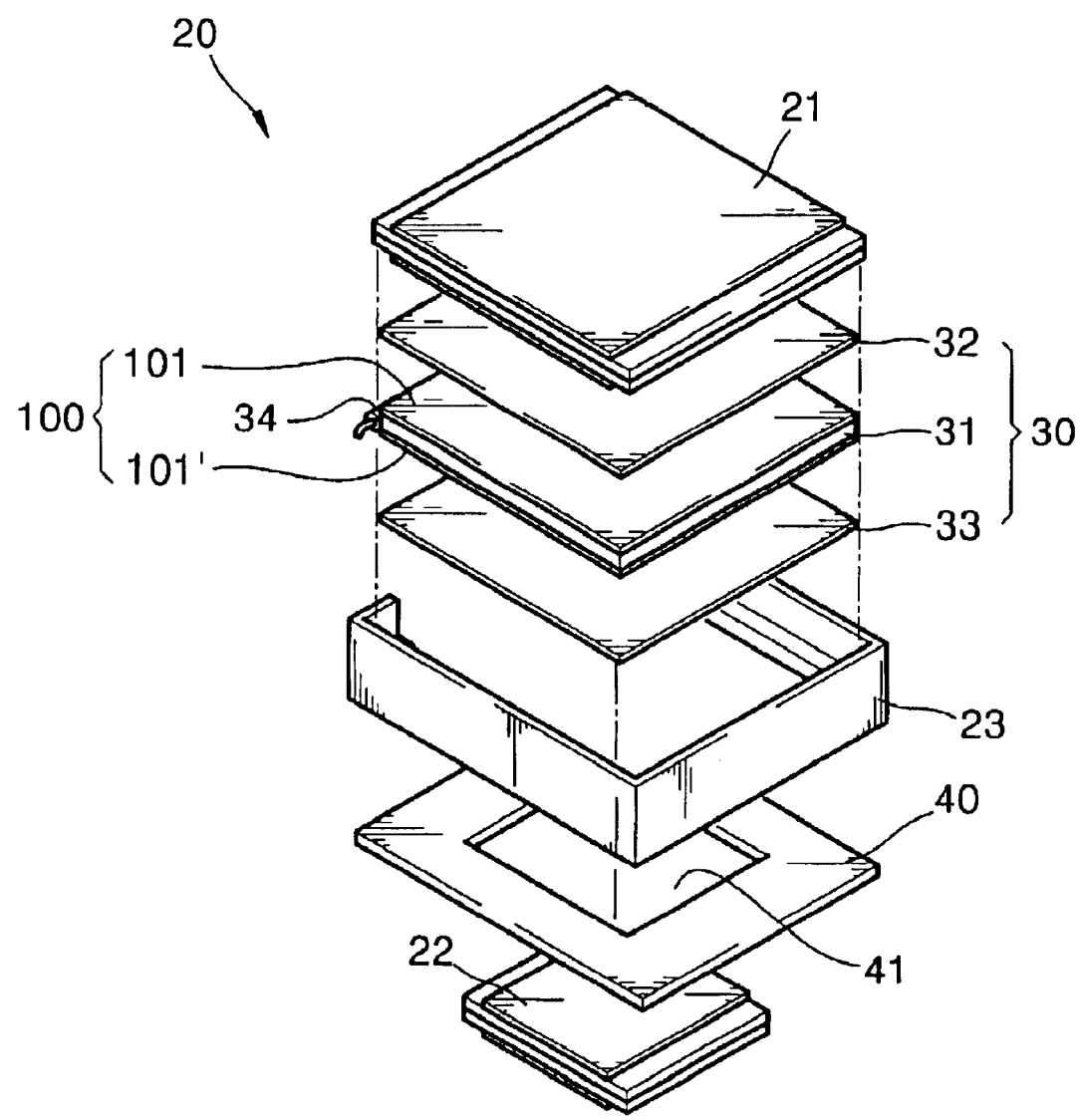
FIG. 3 is an exploded perspective view of the LCD assembly shown in FIG. 2.

As shown in FIG. 3, the surface light source device 30 serves as a light source device for the first and second LCD devices 21 and 22. The surface light source device 30 includes a light guide plate 31 which is made of, for example, a transparent acryl, a light quantity adjustment unit 100 which is provided on at least one of the bottom and top surfaces of the light guide plate 31 and adjusts the quantity of light passing therethrough, diffusion plates 32 and 33 which are respectively installed at the bottom and top surfaces of the light guide plate 31 and diffuse the light passing through the light quantity adjustment unit 100, and an emitting device 34 which is installed in at least one side of the light guide plate 31 to emit the light. A fluorescent lamp or light emitting diode (LED) lamp may be used as the emitting device 34, but the present invention is not restricted thereto.

Figure 4:
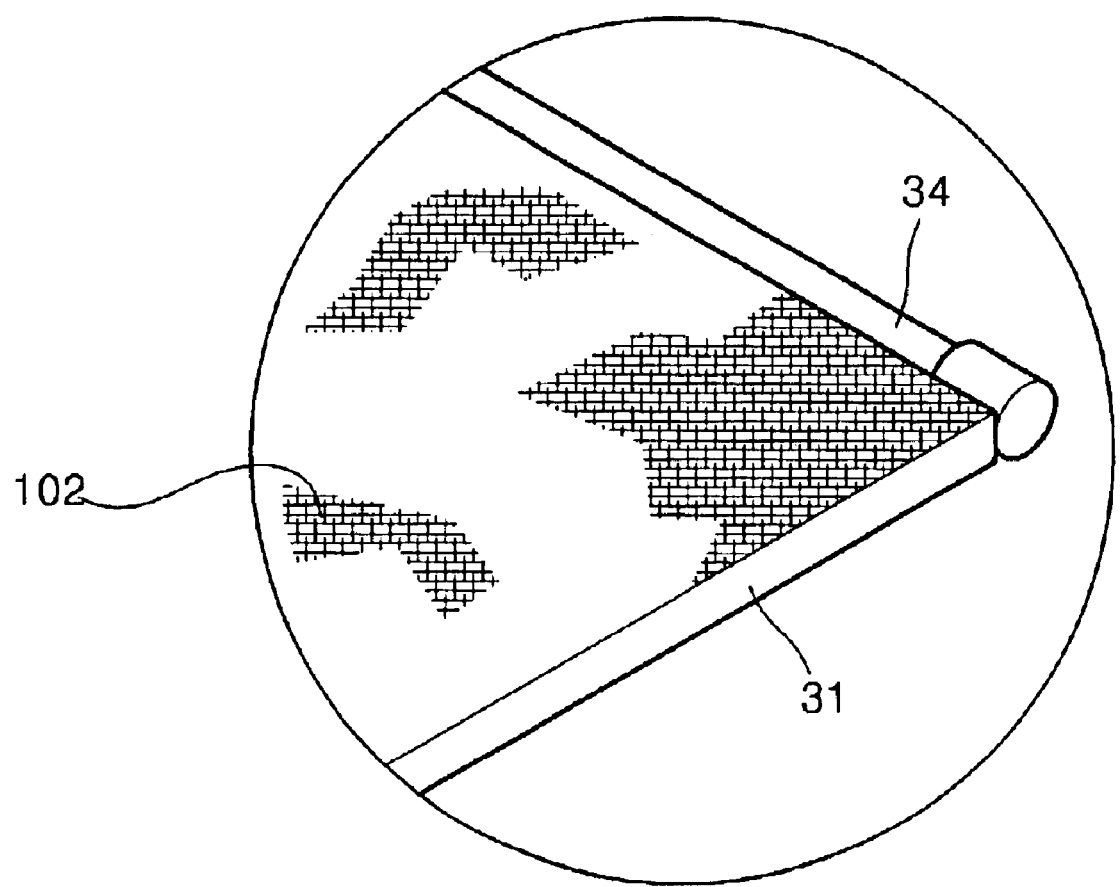
FIG. 4 is a partial perspective view of a light guide plate shown in FIG. 2.

The light quantity adjustment unit 100 which adjusts the quantity of light, i.e., luminance, includes light transmitting sheets 101 and 101' having predetermined transmittances. The light transmitting sheets 101 and 101', which are respectively attached to the top and bottom surfaces of the light guide plate 31, may have different transmittances. In another embodiment of the light quantity adjustment unit 100, as shown in FIG. 4, the light quantity adjustment unit 100 may be implemented by a corrosive surface 102 formed on at least one of the top and bottom surfaces of the light guide plate 31. Where corrosive surfaces are formed on both the top and bottom surface of the light guide plate 31, they may have different transmittances.

Figure 5:
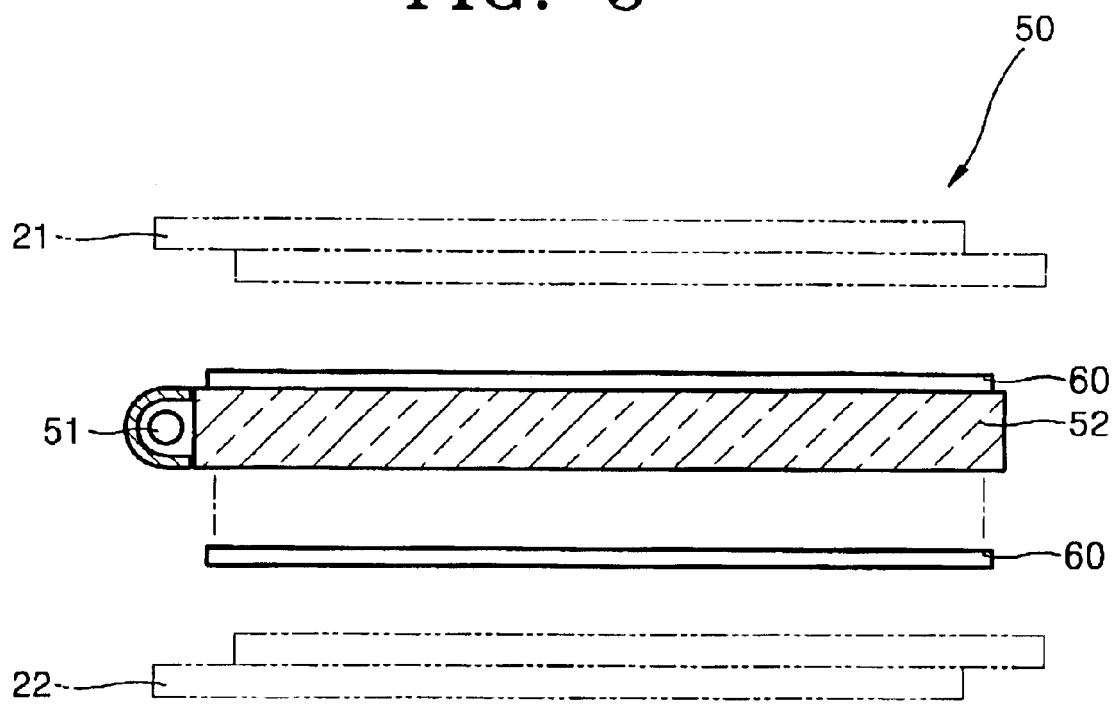
FIG. 5 is a cross-sectional view of a surface light source device according to another embodiment of the present invention.
Figure 6:
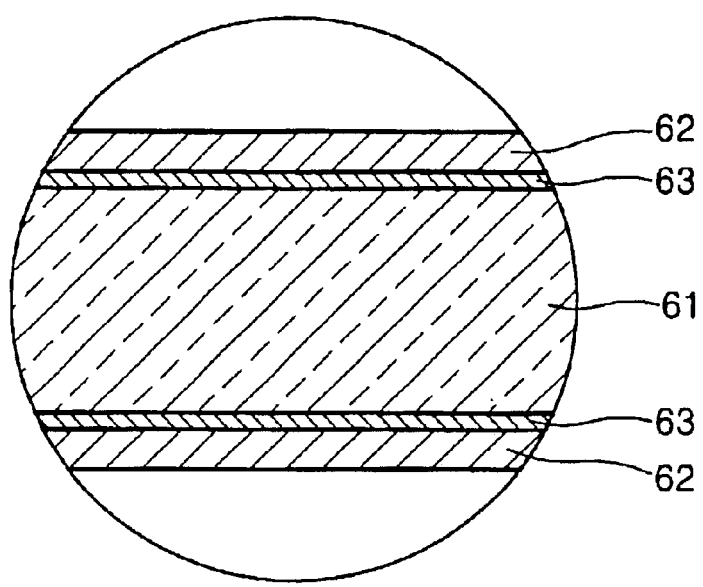
FIG. 6 is an enlarged view of a brightness enhancement film shown in FIG. 5.

FIG. 5 shows a surface light source device according to another embodiment of the present invention. Referring to FIG. 5, the surface light source device 50 includes a lamp 51 which emits light, a light guide plate 52 which seats the lamp 51 at its side or bottom surface and transmits the light emitted from the lamp 51, and a brightness enhancement film 60 which is installed to at least one of the top and bottom surfaces of the light guide plate 52 and provokes the light emitted from the lamp 51 to resonate so as to increase a brightness thereof. As shown in FIG. 6, the brightness enhancement film 60 includes a resonance layer 61 and diffusion layers 62 positioned on top and bottom surfaces of the resonance layer 61. The diffusion layers 62 may be bonded to the resonance layer 61 using an adhesive 63. A Vikuiti brightness enhancement film (BEF) or a dual brightness enhancement film (DBEF) manufactured by 3M Corporation may be used as the brightness enhancement film 60.

In this embodiment, the light quantity adjustment unit 100 may be further provided with respect to the top or bottom surface of the light guide plate 52. The light quantity adjustment unit 100 has been described in detail with reference to FIGS. 3 and 4, and thus a description thereof will be omitted to avoid repetition. The light quantity adjustment unit 100 may be integrally formed with the brightness enhancement film 60. In other words, the quantity of light can be adjusted by adjusting the transmittance of the diffusion layers 62 of the brightness enhancement film 60.

Referring back to FIG. 3, the circuit board 40 may be installed at the bottom surface of the light guide plate 31 or at the case 23. The circuit board 40 may serve as a light blocking device which partially blocks the light emitted from the surface light source device 30. For example, where the second LCD device 22 has an effective screen size that is smaller than that of the first LCD device 21, the circuit board 40 allows the light to be radiated only to an area corresponding to the second LCD device 22. More specifically, a via-hole 41 is formed in the circuit board 40 to correspond to the second LCD device 22. The first and second LCD devices 21 and 22 are joined to the surface light source device 30 using a double side tape 42 shown in FIG. 1, but the present invention is not restricted thereto.

In a surface light source device and an LCD assembly using the same, according to the present invention, light emitted from the emitting device 34 provided at one side of the light guide plate 31 is transmitted through the light guide plate 31 and radiated to both upward and downward.

Figure 7:
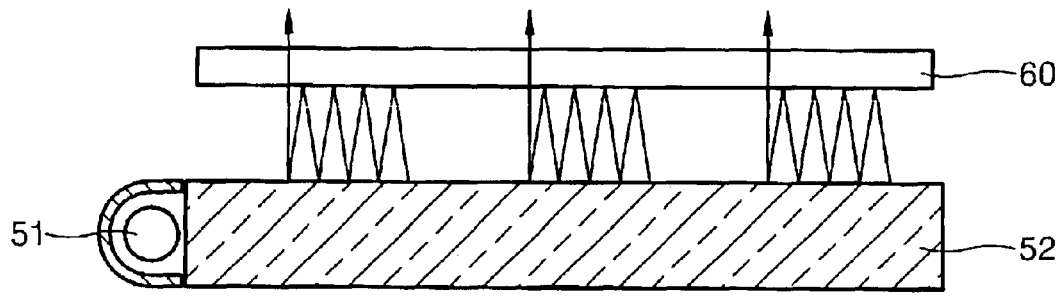
FIG. 7 is a diagram illustrating the operation of the brightness enhancement film shown in FIG. 5.

Since the brightness enhancement films 60 or the light transmitting sheets 101 and 101' having different transmittances are installed on the top and bottom surface of the light guide plate 31 or 50, the brightness of the light emitted from the emitting device 34 or the lamp 51 can be increased, and the light can be radiated above and below the light guide plate 31 or 52 at different luminances. In other words, the quantities of light emitted from the emitting device 34 or the lamp 51 and then transmitted upward and downward through the light guide plate 31 or 52 are equal to one another, but the quantities of light having passed through the light transmitting sheets 101 and 101' or the corrosive surfaces 102 are different from one another above and below the light guide plate 31 or 52, so that the luminance of the first LCD device 21 is different from that of the second LCD device 22. In addition, as shown in FIG. 7, where light transmitted through the light guide plate 52 is not optically coaxial with a polarizing film of an LCD apparatus, the light does not pass through the brightness enhancement film 60, but resonates between the light guide plate 52 and the brightness enhancement film 60, and is then output through the brightness enhancement film 60 with enhanced brightness where its optical axis coincides with that of the polarizing film of the LCD apparatus. Consequently, the brightness of an image can be increased.

After being emitted from the emitting device 34 or the lamp 51 and then enhanced or quantitatively adjusted by the brightness enhancement film 60 or the light quantity adjustment unit 100, the light is diffused by the diffusion plates 32 and 33 and then radiated to the first and second LCD devices 21 and 22.

Figure 8:
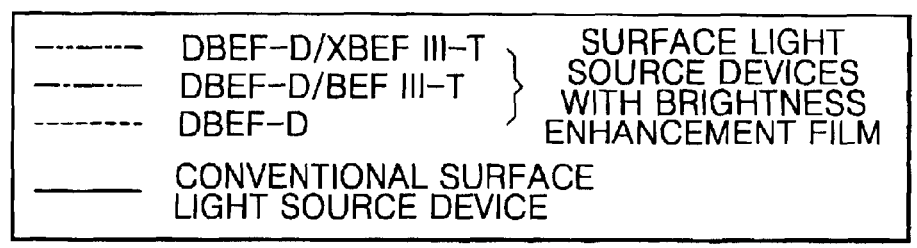
FIG. 8 is a comparison graph showing luminances of surface light source devices having a brightness enhancement film according to the present invention and of a conventional surface light source device.
Figure 8:
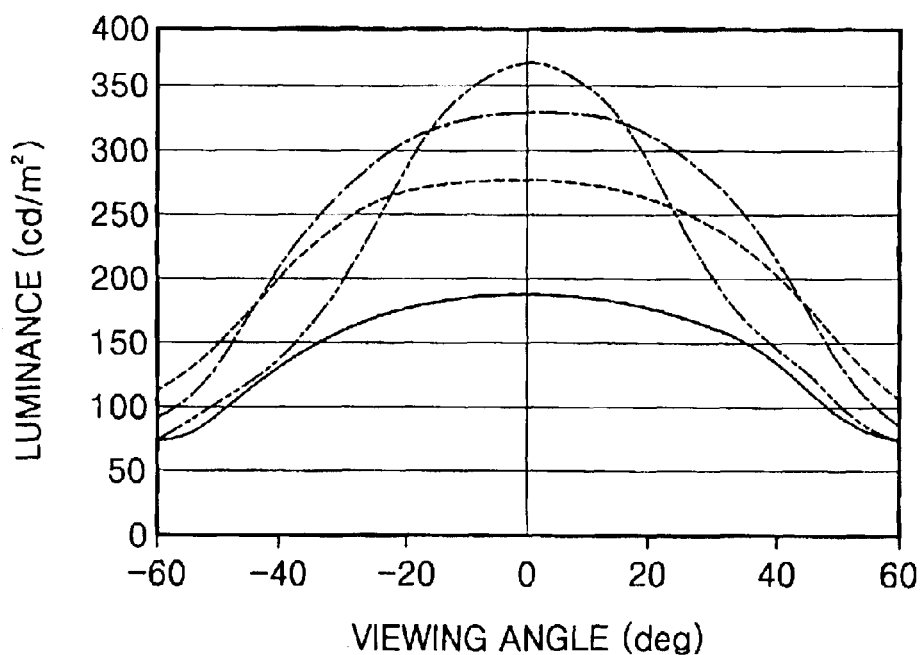

For example, light can be radiated above and below the light guide plate 31 or 52 at different luminances, the luminance of external and internal LCD devices in a dual type cellular phone can be adjusted. In addition, the brightness of the light can be increased in the present invention. As shown in FIG. 8, the brightness of the light of a surface light source device of the present invention is more than 50% higher than that of a conventional surface light source device.

As described above, the present invention provides a surface light source device which is provided between first and second LCD devices and radiates light at the first and second LCD devices in different quantities. Accordingly, the brightness of an image can be adjusted depending on the installation conditions of the first and second LCD devices. In addition, the present invention provides brightness enhancement films on top and bottom surfaces of a light guide plate so as to increase the brightness of light emitted from a surface light source device thereof. Therefore, the brightness of an image formed by an LCD device using the same can be increased. Since the brightness of the surface light source device is high, an afterimage of an LCD device installed at one of the top and bottom surfaces of the surface light source device is prevented from being projected onto another LCD device installed at the other surface.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A surface light source device comprising:
   a light guide plate which guides light upward and downward;
   a light quantity adjustment unit which is provided on at least one of top and bottom surfaces of the light guide plate and adjusts a quantity of the light above the light guide plate to be different from below the light guide plate;
   an emitting device which is installed to at least one side of the light guide plate; and
   diffusion plates which are respectively installed at the top and bottom surfaces of the light guide plate.

2. The surface light source device of claim 1, wherein the light quantity adjustment unit comprises a corrosive surface which is formed by corroding at least one of the top and bottom surfaces of the light guide plate so as to adjust a transmittance of the light.

3. The surface light source device of claim 1, wherein the light quantity adjustment unit comprises a light transmitting sheet having a different transmittance from that of the light guide plate.

4. The surface light source device of claim 1, further comprising a brightness enhancement film which is attached to at least one of the top and bottom surfaces of the light guide plate and resonates the light emitted from the emitting device so as to increase a brightness of the light.

5. The surface light source device of claim 4, wherein the brightness enhancement film comprises a resonance layer and diffusion layers respectively attached to top and bottom surfaces of the resonance layer.

6. The surface light source device of claim 1 further comprising a light blocking device which is installed to at least one of the top and bottom surfaces of the light guide plate having the diffusion plates so as to have a radiation area above the light guide plate be different from that below the light guide plate.

7. A surface light source device comprising:
   a light guide plate which guides light upward and downward; and
   a brightness enhancement film which is provided on at least one of top and bottom surfaces of the light guide plate and resonates the light so as to increase a brightness of the light.

8. The surface light source device of claim 7, wherein the brightness enhancement film comprises a resonance layer and diffusion layers respectively attached to top and bottom surfaces of the resonance layer.

9. A liquid crystal display (LCD) assembly comprising:
   first and second LCD devices which are stacked with respect to each other;

a light guide plate which is disposed between the first and second LCD devices and guides light upward and downward;

a light quantity adjustment unit which is provided on at least one of top and bottom surfaces of the light guide plate and adjusts a quantity of the light above the light guide plate to be different from below the light guide plate;

an emitting device which is installed to at least one side of the light guide plate; and diffusion plates which are respectively installed at the top and bottom surfaces of the light guide plate.

10. The LCD assembly of claim 9, further comprising a light blocking device which restricts the light radiated to one of the first and second LCD devices to an area corresponding to the one of the first and second LCD devices.

11. The LCD assembly of claim 10, wherein the light blocking device comprises a circuit board.

12. The LCD assembly of claim 9, further comprising a brightness enhancement film which is attached to at least one of the top and bottom surfaces of the light guide plate and resonates the light emitted from the emitting device so as to increase a brightness of the light.

13. A liquid crystal display (LCD) assembly comprising:

first and second LCD devices which are stacked with respect to each other;

a light guide plate which is disposed between the first and second LCD devices and guides light upward and downward;

an emitting device which is installed to one side of the light guide plate; and a brightness enhancement film which is attached to at least one of top and bottom surfaces of the light guide plate and resonates the light emitted from the emitting device so as to increase a brightness of the light.

14. The LCD assembly of claim 13, further comprising a light quantity adjustment unit which is provided on at least one of the top and bottom surfaces of the light guide plate and adjusts a quantity of the light above the light guide plate to be different from below the light guide plate.

* * * * *